United States Patent [19]
Sill

[11] Patent Number: 5,079,851
[45] Date of Patent: Jan. 14, 1992

[54] NOTATION AREA INSERT FOR A TAPE MEASURE

[76] Inventor: Kenneth A. Sill, 511 E. Blue Earth Ave., Fairmont, Minn. 56031

[21] Appl. No.: 711,567

[22] Filed: May 30, 1991

Related U.S. Application Data

[63] Continuation of Ser. No. 386,578, Jul. 28, 1989, abandoned.

[51] Int. Cl.⁵ .................................................. G01B 3/10
[52] U.S. Cl. ........................................ 33/760; 33/768; 33/770
[58] Field of Search ................. 33/755, 760, 761, 768, 33/769, 770

[56] References Cited

U.S. PATENT DOCUMENTS

| | | | |
|---|---|---|---|
| 2,914,269 | 11/1959 | Freeman | 33/761 |
| 3,524,273 | 8/1970 | Shore | 33/761 |
| 3,553,864 | 1/1971 | Karlyn et al. | 434/408 |
| 3,642,191 | 2/1972 | Roof | 434/408 |
| 3,672,597 | 6/1972 | Williamson | 33/761 |
| 3,838,520 | 10/1974 | Quenot | 33/760 |
| 4,015,337 | 4/1977 | Taylor | 33/668 |
| 4,665,620 | 5/1987 | Osteen | 33/760 |
| 4,766,673 | 8/1988 | Bolson | 33/760 |
| 4,786,010 | 11/1988 | Dynan | 33/760 |

FOREIGN PATENT DOCUMENTS

| | | | |
|---|---|---|---|
| 661213 | 4/1963 | Canada | 434/408 |
| 10418 | of 1885 | United Kingdom | 33/760 |
| 1223035 | 2/1971 | United Kingdom | 434/408 |
| 1226055 | 3/1971 | United Kingdom | 33/758 |
| 1534971 | 12/1978 | United Kingdom | 33/767 |
| 2186692 | 8/1987 | United Kingdom | 33/755 |

*Primary Examiner*—William A. Cuchlinski, Jr.
*Assistant Examiner*—Alvin Wirthlin
*Attorney, Agent, or Firm*—Merchant, Gould, Smith, Edell, Welter & Schmidt

[57] ABSTRACT

An improved tape measure having a writing member is disclosed. The writing member has a front surface for receiving markings and a back surface with an adhesive connected to the back surface for attaching the writing member to the tape measure device.

7 Claims, 1 Drawing Sheet

NOTATION AREA INSERT FOR A TAPE MEASURE

This is a continuation of application Ser. No. 07/386,578, filed July 28, 1989, which was abandoned upon the filing hereof.

FIELD OF THE INVENTION

This invention relates generally to a reusable writing device for tools and more particularly, to a reusable writing device used in conjunction with a tape measure to allow the user to record data while using the tool.

BACKGROUND OF THE INVENTION

Tool users, such as carpenters and others skilled in the art, have long been hampered by the unavailability of a convenient writing surface that is readily available, easy to use, and inexpensive for recording measurements or making diagrams and the like. This need has been particularly acute for those using tape measures, where it is necessary to record measurements so that materials may be cut and used as efficiently and cost effectively as possible.

While a number of various items or articles are available in the work place to record important information, they have generally been unacceptable for a number of different reasons. For example, a worker may record writings and drawings on paper carried to the work site. This poses a problem because it is not practical for a tool user to carry paper. Further, the use of disposable materials entails additional work because it must be disposed of. At present, workers may record data on construction materials. This method has met with limited success as it is often very difficult, if not impossible, to move such materials to the proper place for cutting or fitting. Further, the above-described means for recording data are generally not reusable and therefore are unmanageable for a worker who must carry the means for recording data throughout the work day.

The present invention offers a reusable writing surface that fills a need in the art for a simple, effective, inexpensive and easy to use device, the use of which is not limited by the needs and limitations of a carpenter or other tool user.

SUMMARY OF THE INVENTION

The present invention comprises a reusable writing surface of the type particularly suitable for use with tools and the like. The device includes a reusable writing member having a front surface and a back surface. A pressure sensitive adhesive is connected to the writing member whereby the device may be adhered to a tool.

In a preferred embodiment of the device, the reusable writing member comprises a transparent plastic for receiving markings which may be removed. Further, the preferred embodiment of the invention includes a design connected to the back surface of the writing member which may be seen through the transparent front surface. A layer of adhesive is bonded to the back of the design. A backing may be connected to the adhesive so that the device is protected until a user adheres it to the preferred tool or article.

While the present invention will be described with respect to a preferred configuration of the device, and with respect to preferred materials and shapes of construction, it will be understood that other configurations, materials, and shapes could be used for constructing the device, without departing from the sphere and scope of this invention. Various advantages and features of novelty which characterize the invention are pointed out with particularity in the claims annexed hereto and which form a part hereof. However, for a better understanding of the invention and its advantages obtained by its use, reference should be made to the drawings which form a further part hereof and to the accompanying descriptive matter in which there is illustrated and described a preferred embodiment of the invention.

BRIEF DESCRIPTION OF THE DRAWINGS

Referring to the drawings, wherein like numerals represent like parts throughout the several views.

DETAILED DESCRIPTION OF THE INVENTION

Referring to the Figures, there is generally illustrated at 10 a reusable writing device or notation area insert of a configuration and shape particularly suitable for use with tools and the like, wherein the device is used to record data. The data is easily removed from the surface by eraser, rubbing, or wiping with water or another liquid. In the preferred embodiment, the device 10 includes a reusable writing member 12 made of a plastic material. The writing member 12 may comprise any appropriate plastic material suitable for receiving markings by a pencil, and is preferably of a polycarbonate material or polyvinyl chloride material. In the preferred embodiment of the invention, LEXAN ® has been found to perform satisfactorily. LEXAN ® is a polycarbonate material manufactured by General Electric. Any appropriate material which could be cleaned by a conventional eraser or using a small amount of water or liquid to moisten the surface and wipe it clean would be adequate. In the preferred embodiment, it has been found that use of a material which does not absorb dirt or other extraneous matter and does not scratch easily is preferable. Scratches and/or absorption would hinder use of the device. Use of a pencil has been found to be a preferable writing implement although other implements may be used.

Figure 1:
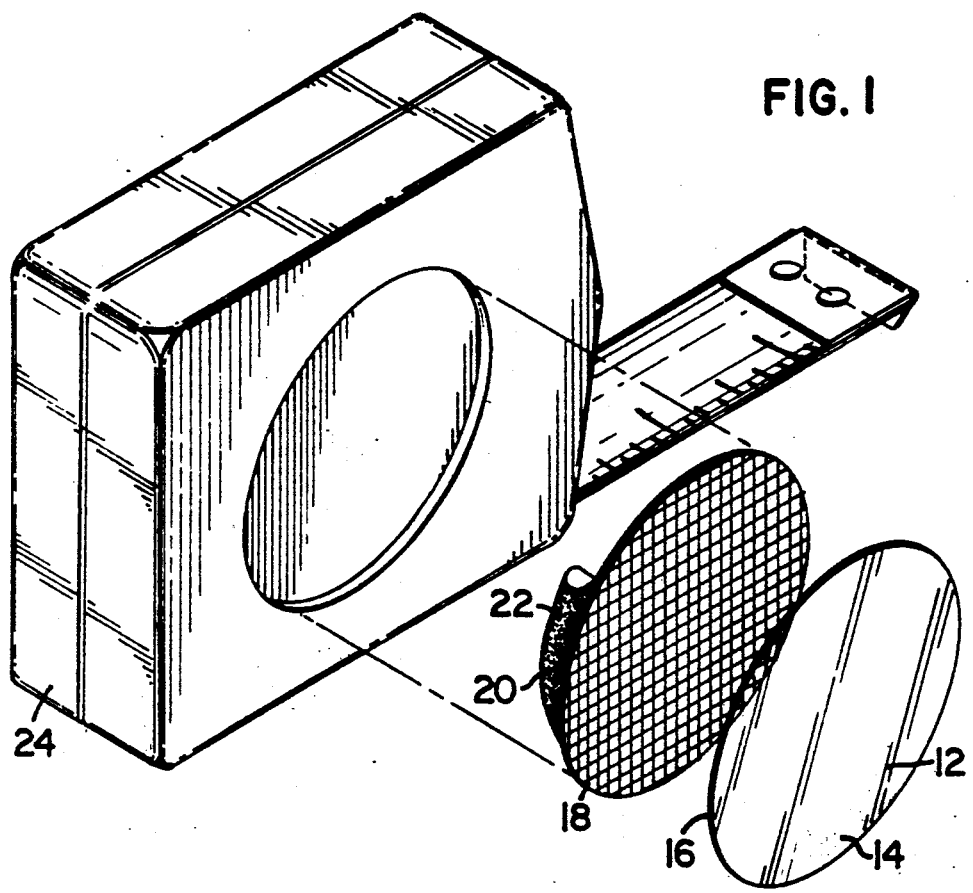
FIG. 1 is an exploded perspective view of the device constructed according to the principles of this invention and illustrating its position on a tool, such as a tape measure.
Figure 2:
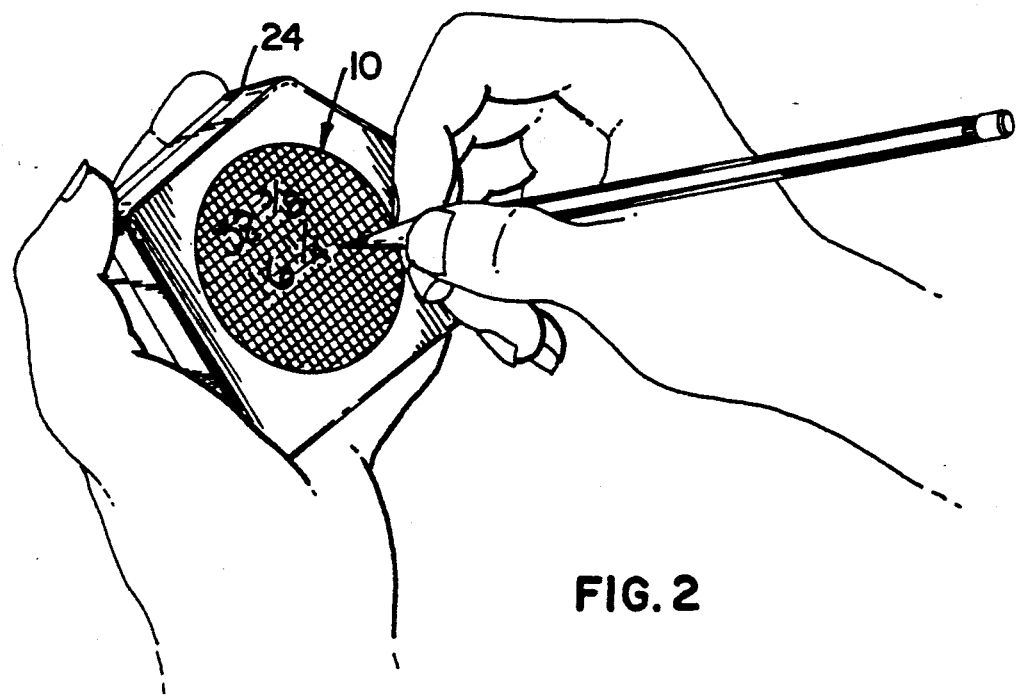
FIG. 2 is a perspective view of an example of usage of the device disclosed in FIG. 1.

The writing member 12 is a generally circular disk, as illustrated in FIGS. 1 and 2 in the preferred embodiment. This shape is particularly useful for applying the device to tape measures such as illustrated in FIG. 2. While it will be understood that many configurations, sizes and shapes of the device can be envisioned within the sphere and scope of the invention, dimensions of the generally circular writing member 12 as illustrated in FIGS. 1 and 2 of the preferred embodiment are 2⅜ inches in diameter and 1/32 inch thick. Dimensions and configurations may be modified and changed within the scope of the invention to suit varying applications.

The writing member 12 includes a front surface 14 and a back surface 16 where the front surface 14 receives the markings of the user. A design layer 18 is connected to the back surface 16 of the writing member 12 in the preferred embodiment. It should be understood that the design layer 18 may be of any suitable material and configuration and may be connected to the writing member 12 by any suitable means. However, in the preferred embodiment the design is silk screened onto the back surface 16 of the writing member 12. For purposes of clarity, the design layer 18 is shown as a separate layer in FIG. 1 although the design is silk screened to writing member 12 in the preferred embodiment. By means of example, the design layer 18 could incorporate a grid to aid in drawing diagrams, as shown in the preferred embodiment. A ⅛ inch grid is utilized in the preferred embodiment to aid in drawing diagrams.

An alternative embodiment may include a design layer 18 including a layer of vinyl or other suitable material. The layer of vinyl may provide a background with or without a design. The layer of vinyl may be combined with the silk screening of a design to the back surface 16 of the writing member. An adhesive cooperatively connects the vinyl layer or material to the writing member 12. It should be understood that any other means to connect the design layer 18 to the writing member 12 may be utilized.

The design layer 18 could consist of almost anything, including a logo for advertisement or other information desired by the worker or the advertiser. The placement of the design on the back surface 16 of the writing member 12 ensures that the design layer 18 will not wear. The design layer 18 is sized and configured to fit the configuration of the writing member 12 in the preferred embodiment. It should be understood that the configuration and size of the design may be of any desired specification which falls within the scope of this invention.

A pressure sensitive adhesive 20 is applied to the back surface 16 of the writing member 12 or if a design is incorporated, the adhesive is applied to the back of the design layer 18. The adhesive utilized in the preferred embodiment is 467 High Performance adhesive manufactured by 3M of Minnesota. The adhesive 20 is used to adhere the device of the present invention to a tool or other appropriate surface.

A backing or adhesive protectant 22 may be connected to the adhesive layer 20 to protect the adhesive during shipping and handling. In the preferred embodiment, a waxed paper backing sheet is used to cover the adhesive. This backing 22 may be removed by the user in order to use the present invention. The paper backing 22 is optional and serves only to protect the adhesive during shipment and storage. The paper backing 22 is shown curled away from the adhesive layer 20 in FIG. 1 to demonstrate that the backing 22 in the preferred embodiment is removed in this manner.

In use, the adhesive protectant or backing 22 is removed by the user and the device is preferrably placed within a depression on a tool, such as in the depression on the side of a tape measure 24, as shown in FIG. 2. The user may take measurements for example, and then record this data on the front surface 14 of writing member 12 with a pencil, as shown in FIG. 2. The writing member 12 may also be used for recording a list of materials needed by the worker or may be used to leave notes to others in the work area.

To remove the markings, the user merely rubs the front surface 14 thereby eliminating the writing. Another means of removal of the marking is to moisten the front surface 14 and wipe it clean. Also, a pencil eraser may be used to erase the data from the device 10. Therefore, the present invention provides a reusable writing surface or note pad for users of tools and the like, and more particularly tape measures. The invention provides the advantage of an easily available writing surface in conjunction with the standard measuring tool used in the industry. The present invention fulfills the need for a handy, inexpensive method of keeping track of measurements and other information useful to workers. In the preferred embodiment, the device combines a reusable writing surface with a necessary tool of the trade. In this way, there is no need to carry an additional piece of equipment to perform this function. The present invention provides a means for recording measurements, performing calculations and recording reminders. In this manner, the present invention leads to a saving of materials and time for workers and users. Mistakes which result from error in memory or recording of measurements are eliminated. Time spent in re-checking measurements is also eliminated.

As discussed above, the particular configuration and shape of the device 10 can be varied to suit the particular conditions and requirements of its usage. An example of how the device 10 may be varied is with tools of different size and shape. The device 10 may be modified to cover a larger or smaller area depending on the size of tool used.

It is believed that the invention, its mode of operation, construction and assembly and many of its advantages should be readily understood from the foregoing without further description. While a particular embodiment of the invention has been described, other modifications of the invention will be apparent to those skilled in the art in light of the foregoing description. This description is intended to provide a specific example of an embodiment which clearly discloses the present invention. Accordingly, the invention is not limited to the described embodiment or the use of specific elements therein. All alternative modifications and variations of the present invention which fall within the sphere and broad scope of the appended claims are covered.

What is claimed is:

1. A notation area insert of a type that inlays into a depression in a sidewall of a conventional tape measure device comprising:
   (i) a reusable marking member made of a substantially transparent material and having a front surface on which notes may be marked and erased;
   (ii) a design layer having a front surface bearing permanent markings;
   (iii) a first adhesion means for adhering said design layer within the depression with said front surface of said design layer facing away out of the depression; and
   (iv) a second adhesion means for adhering said reusable marking member to said design layer with said front surface of said reusable marking member facing away from said design layer, wherein said front surface of said reusable marking member is within the depression, and wherein said second adhesion means is transparent, and said permanent markings show through said second adhesion means and said reusable marking member.

2. The insert of claim 1 further including a removable backing connected to said first adhesion means to protect said first adhesion means until said backing is removed.

3. The insert of claim 1 wherein said reusable marking member comprises polyvinyl chloride.

4. The insert of claim 1 wherein said reusable marking member comprises polycarbonate.

5. The insert of claim 1, wherein said design layer is silk screened to said reusable marking layer.

6. The insert of claim 1, wherein said notation area insert is circular and has a diameter of approximately 2⅜ inches.

7. The insert of claim 1, wherein said notation area insert has a uniform thickness of 1/32 of an inch or less.

* * * * *